Figure 1B:
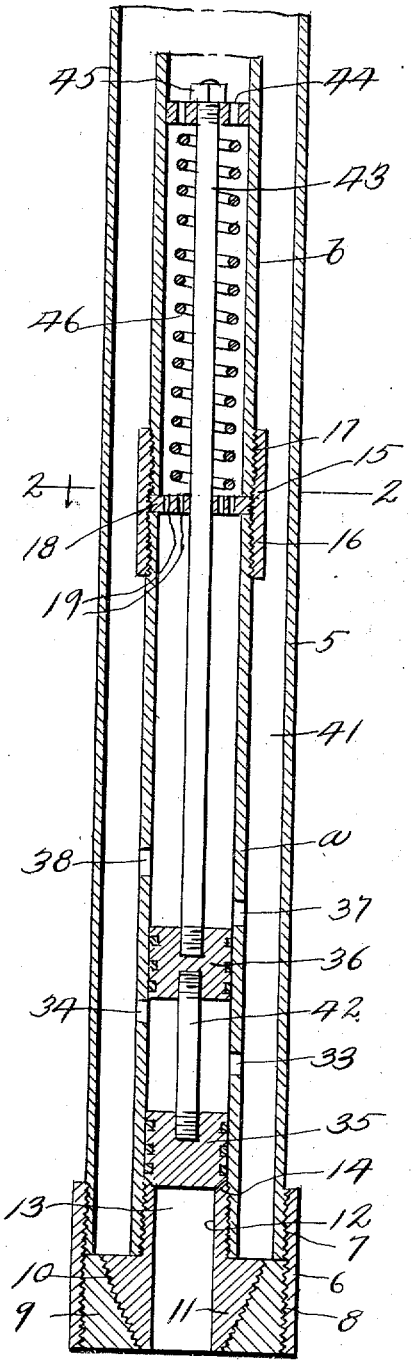

Jan. 17, 1933. P. G. SHERRY Re. 18,717

DEVICE FOR PUMPING OIL FROM A WELL

Original Filed Feb. 8, 1930 2 Sheets-Sheet 1

Inventor
Phillip G. Sherry
By Philip A. H. Sewell
Attorney

Jan. 17, 1933. P. G. SHERRY Re. 18,717

DEVICE FOR PUMPING OIL FROM A WELL

Original Filed Feb. 8, 1930 2 Sheets-Sheet 2

Inventor
Phillip G. Sherry
By Philip A. Tenell
Attorney

Reissued Jan. 17, 1933

Re. 18,717

UNITED STATES PATENT OFFICE

PHILLIP G. SHERRY, OF OKLAHOMA CITY, OKLAHOMA, ASSIGNOR, BY DIRECT AND MESNE ASSIGNMENTS, TO P. F. O'BRIEN, OF SHREVEPORT, LOUISIANA

DEVICE FOR PUMPING OIL FROM A WELL

Original No. 1,835,437, dated December 8, 1931, Serial No. 426,889, filed February 8, 1930. Application for reissue filed August 3, 1932. Serial No. 627,384.

This invention relates to a device for forcing oil out of an oil well, and the primary object of the invention is to provide a device of this character embodying an elongated tubular casing adapted to extend downwardly beyond the conventional oil well casing, and having its lower end at the bottom of the oil well together with a plurality of interconnected tubings disposed end to end and extending through the tubular casing and a pair of pistons controlled from a single string operable within the lower section of the string of interconnected tube sections, which pistons are to be acted upon by pressure for seating the pistons on a valve seat and allowing the further application of pressure to force upwardly the column of oil which has previously risen in the casing and discharge the same from the well.

A further object is to provide an oil well comprising a main casing, an auxiliary casing axially disposed in the main casing in spaced relation thereto, a normally open valve in the lower end of the auxiliary casing and controlling ports of communication between the chambers of the casings and means whereby when pressure is forced downwardly through the auxiliary casing the valve will be seated and fluid lifted from the casings.

A further object is to provide a fluid lifting well device, into the lower end of which fluid naturally rises, said well comprising main and auxiliary casings into which the fluid rises, a vertically movable valve in the auxiliary casing and normally out of engagement with the valve seat, ports of communication between the chambers of the casings and means whereby when pressure is forced through the auxiliary casing the piston will be moved to closed position and the further application of pressure will lift the column of fluid in the casings, to a point of discharge. Also to provide means whereby the lifted column of fluid will pass inwardly to a discharge pipe of smaller diameter than the casing, thereby reducing the frictional surface exposed to the upwardly movable column of fluid to a minimum.

A still further object of the invention is to provide a device of this nature which is simple in construction, consists of but comparatively few parts, can be readily and easily assembled, expeditiously inserted within a well, not liable to easily get out of working order, and otherwise well adapted for the purpose designed.

Figure 1:
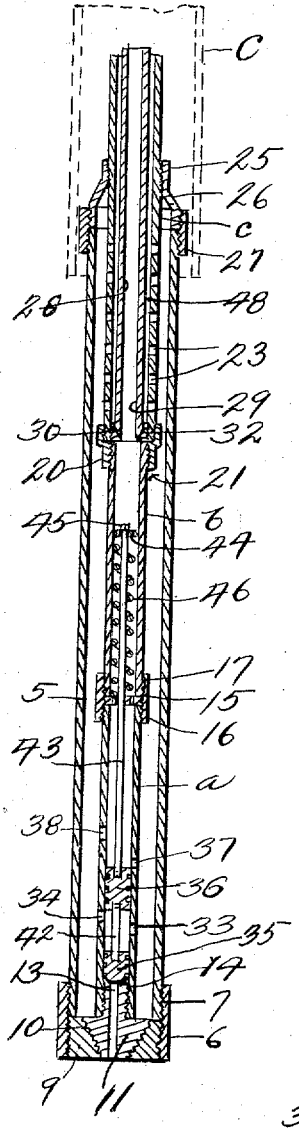

Other objects and advantages of the invention will become apparent during a study of the following description, taken in connection with the accompanying drawings wherein:

Figure 1 is a longitudinal sectional view taken through the device.

Figure 1A:
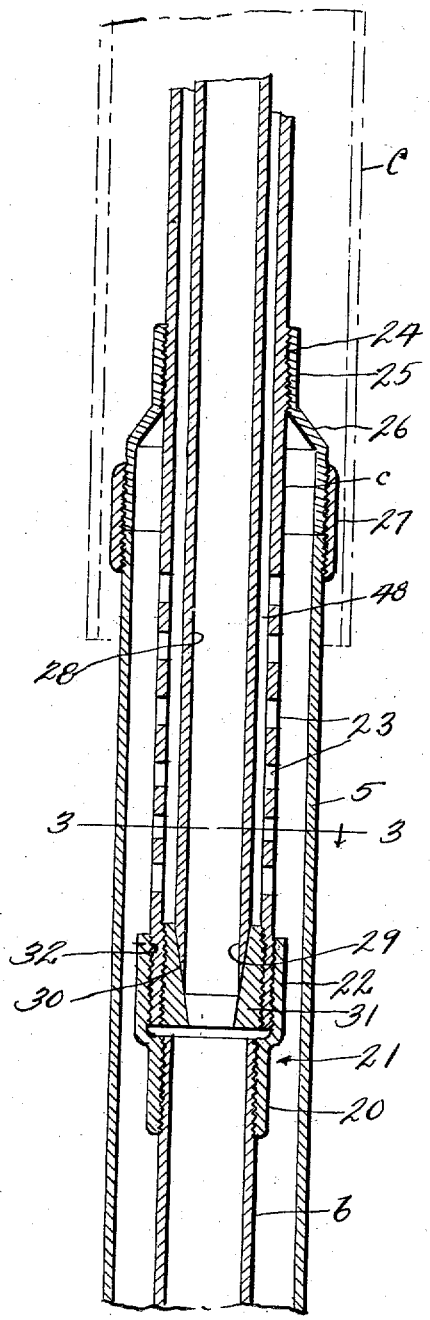

Figure 1*a* is a longitudinal sectional view taken through the device at the upper end thereof;

Figure 1*b* is a continuation of Figure 1*a* and further is a longitudinal sectional view taken through the lower end of the device.

Figure 2:
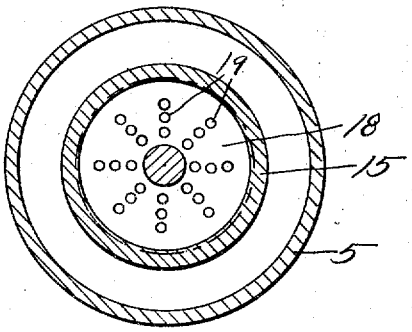
Figure 3:
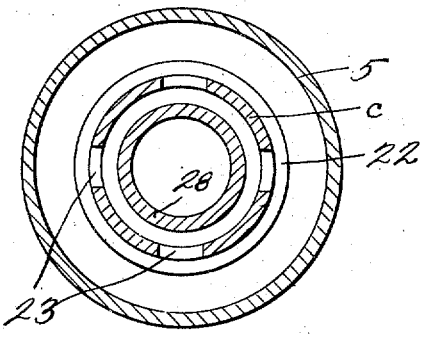

Figures 2 and 3 are horizontal cross sectional views taken substantially on line 2—2 of Figure 1*b* and line 3—3 Figure 1*a* respectively.

Figure 4:
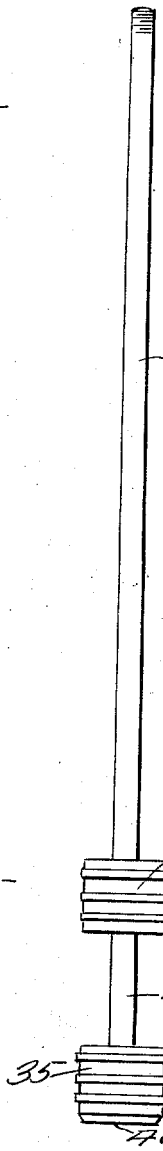

Figure 4 is an elevation view of the piston and piston rod therefor.

With reference more in detail to the drawings, it will be seen that my invention comprehends the provision of an outer elongated tubular casing 5 open at its top and bottom ends. The casing 5 is adapted to be extended into the well, and said casing 5 projecting beyond the lower end of the conventional well casing shown in broken lines in Figure 1*a* and designated generally by the reference character C.

The upper end of the tubular casing 5 extends inwardly of the lower end of the conventional well casing as shown.

A collar or coupling 6 at its upper end is provided internally with right hand threads 7 for threaded engagement with the lower complementary threaded end of the casing 5, said collar section at its lower end being provided with internal left hand threads 8, and in said lower end has threaded a boxing or annular member 9 as shown to advantage in Figure 1*b*.

The boxing or annular member 9 has an internally threaded tapered opening 10, within which is threaded a tapered plug 11, which plug 11 at its upper end is provided with an externally threaded tubular extension 12, having a vertical bore 13 extending therethrough and through the plug 11. The upper end of the tubular extension 12 is beveled inwardly to provide a valve seat 14 for a purpose to be hereinafter made manifest.

The tubular extension 12 extends into and is threadedly engaged with the internally threaded lower end of a pipe section or working cylinder *a*. The pipe section or working cylinder *a* is of suitable length open at its upper end as apparent, and extends upwardly through the casing 5.

A pipe section *b* is complemental to the pipe section *a* is arranged in the casing 5 in longitudinal alinement with said section *a*. A sleeve or coupling 15 has the lower end portion thereof internally threaded for engagement with the external threads on the upper end of the pipe section *a* as at 16.

At its upper end the coupling 15 is internally threaded for a threaded connection with the external threads on the lower end of the complemental pipe section *b* as at 17, and it is to be noted the adjacent ends of the section *a* and *b* are disposed in spaced relation and have located therebetween a disk 18 having radially extending series of perforations 19 formed therein.

As shown to advantage in Figure 1*a*, the complemental pipe section *b* at its upper end is also externally threaded for engagement with the internally threaded tubular portion 20 of a coupling designated generally by the reference character 21.

The coupling 21 also embodies an enlarged internally threaded upper cylindrical portion 22 for threaded engagement with the externally threaded lower end of an upper tubing section designated generally by the reference character *c*. The tubing section *c* extends upwardly beyond the upper end of the casing 5, through the well casing C to the surface or to the top of the oil well.

The lower portion of the casing section *c* within the upper end of the casing 5 is perforated about its periphery as at 23.

Above the upper end of the casing 5 the tubular section *b* is externally threaded as at 24 for threaded engagement with the internally threaded neck 25 formed on the upper reduced end 26 of a coupling member 27 disposed circumjacent the tubing section *b* and having its lower edge in abutting relation with the upper edge of the casing 5.

A suitable annular coupling member 27 is internally threaded, for threaded engagement with said member 26 and casing 5 at the abutting ends of said member 26 and casing 5 as shown to advantage in Figure 1*a*.

An elongated pipe or tubing 28 extends through the upper tubing secton *c* and has its lower or inner end tapered as at 29 for conformably fitting within the tapered bore 30 of a coupling ring 31 which coupling ring 31 is externally threaded for threaded engagement with the internal threads formed in the lower end of said casing section *c* as at 32. (See Figure 1*a*.)

The coupling ring 31 thus provides a fluid tight joint between the adjacent end of the tube 28 and casing section *c* within the enlarged cylindrical portion 22 of the coupling member 21.

As shown to advantage in Figure 1*b*, the lower tube section *a* upwardly from its lowermost end is provided on diametrically opposite sides with intake ports 33 and 34 respectively, the intake port 34 being disposed on a plane above the intake port 33, and these ports 33 and 34 are controlled by a piston 35 adapted for reciprocatory movement within the lower tube section *a* beneath or in advance of an upper piston 36, which piston 36 is also adapted for reciprocatory movement within the lower tubing section *a* or working cylinder as herein before referred to. for controlling diametrically opposite ports 37 and 38 respectively, in the pipe or tube section *a* above the ports 33 and 34, it being also noted that the port 38 is disposed on a plane above the port 37, and that consequently all the ports, 33, 34, 37 and 38 are thus arranged in alternate relation on diametrically opposite sides of the casing *a*.

Each of the pistons 35 and 36 are suitably provided with packing rings 39, there being preferably two packing rings for each piston. The lower piston 35 is provided with a tapered lower end portion 40 to facilitate the seating of the lower piston 35 on the valve seat 14, so that it will be noted the piston 35 also acts as a valve for controlling the intake passage or bore 13 which extends through the member 11 and its cylindrical extension 12 to constitute an intake passage communicating with the lower tube section *a*.

It is also to be noted that the box 9 and member 11 cooperate to provide a bottom or lower end closure for the passage 41 between the spaced casing 5, and the tube sections *a* and *b* for a purpose to be presently made manifest.

A relatively short connecting rod 42 has its lower end threaded in a suitable socket formed in the top of the lowermost piston 35, the upper end of the rod 42 being threaded within a socket opening inwardly from the bottom of the upper piston 36 as shown to advantage in Figure 1*b*.

An elongated piston rod 43 has its lower end threaded within a complementarily threaded socket opening inwardly from the top of the upper most piston 36, and this piston rod 43 extends upwardly through a central opening provided therefor in the disc or washer 18, the upper end of the piston rod extending upwardly through the tube section *b*.

Mounted on the upper end of the piston rod 43 is a perforated washer 44 and a nut 45 is threaded on the upper end of the piston rod 43 for retaining the washer 44 thereon. A coil spring 46 is concoluted about the upper end of the piston rod 43, one end of said coil spring 36 resting upon the washer 18, and the upper end of the coil spring impinging against the washer 44 for normally urging the piston upwardly of the tubing section *a* above the ports 33, 34, 37 and 38.

The operation of the device may be briefly set forth as follows:—

Assuming that the fluid, for instance oil, rises naturally upwardly into the lower ends of the casing section *a* and the casing 5 passing into the chamber 41 of the casing 5 through the ports 33, 34, 37 and 38 which are uncovered as the pistons 35 and 36 are in raised position under the influence of the expansion spring 46. Pressure is forced through pipe 28 to pass through the tubing sections *a* and *b* for acting upon the pistons 36 and 35 for urging the pistons downwardly against the action of the spring 46 to seat the lower piston 35 upon its seat 14, and the continued application of pressure after the seating operation will cause said pressure to pass through the ports 37 and 38 and force the column of liquid, which has previously risen under natural pressure into the casing 5 upwardly.

The continued application of pressure will continue to lift the fluid upwardly through the chamber 41 of the casing 5. The lifted fluid then passes inwardly through the ports 23 into the chamber 48 of the casing section *c*, around the pipe 28. It will be noted by passing the liquid inwardly into a pipe *c* of smaller diameter that the frictional surface engagement for the liquid will be reduced, thereby reducing the amount of power necessary for the fluid lifting operation. Upon relief of pressure the expansion spring 46 will unseat the piston 35 and move the pistons upwardly to a position where the ports 33, 34, 37 and 38 will be uncovered. It will be noted that when the pistons are in upper position, all the ports are uncovered thereby allowing a rapid filling of the chamber 41 of the casing 5, preliminary to the next application of pressure. The above operation continues for the pumping operation, and the fluid may be discharged from the upper end of the device and conveyed to any suitable place of storage.

It is thought from the foreging description, taken in connection with the accompanying drawings, a clear understanding of the operation, construction, utility and advantages of a device of this character will be had by those skilled in this art without a more detailed description thereof.

Even though I have herein shown and described the preferred embodiment of my invention, it is to be understood that the same is susceptible to changes fully comprehended by the spirit of the invention as herein described and claimed, and the scope of the appended claims.

The invention having been set forth what is claimed as new and useful is:—

1. In a device for forcing free rising fluid from a well, inner and outer spaced tubular members, means of communication between the tubular members, a member threaded in the lower end of the inner tubular member and having a bore therethrough providing an intake passage for said inner tubular member and through which the free rising fluid rises and a normally open spring controlled spaced apart pair of sealing members adapted to be downwardly moved under pressure in the inner tubular member one of which constitutes means for controlling said intake passage, said fluid being pressure lifted interiorly of said inner tubular member through the means of communication between the tubular members.

2. In a device for forcing free rising fluid from a well, inner and outer spaced tubular members, a member threaded in the lower end of the inner tubular member and having a bore therethrough providing an intake passage for said inner tubular member, and spring opened spaced apart pressure actuated members adapted for reciprocatory movement within said inner tubular member, one of which reciprocating members constitutes means for controlling the rise of fluid through said intake passage interiorly of said tubular member when moved in one direction and said inner tubular member at the lower end thereof being provided with ports controlled by said pressure actuated member, whereby fluid from the well may be trapped in the space between said inner and outer tubular member and the pressure utilized for seating the spring actuated spaced apart member utilized for lifting fluid in said space as long as continuous pressure is applied.

3. In a device of the class described for lifting free rising fluid from a well, inner and outer spaced tubular members, a member threaded in the lower end of the inner tubular member and having a bore therethrough providing an intake passage for said inner tubular member, and spring controlled spaced apart pressure actuated members adapted for reciprocatory movement within said inner tubular member, one of which constitutes means for controlling said intake passage for closing off the flow of fluid into the casing when pressure is applied in the inner casing, ports of communication between said casings and through which free rising fluid passes to the chamber of the outer casing, the pressure utilized for actuating said pressure actuated members being by-passed when said members are seated through the ports of communication and utilized for lifting the fluid therein.

4. In a device for forcing free rising fluid by pressure from a well, inner and outer spaced tubular members, means for closing the upper end of the outer tubular member, means for closing the lower end of said outer tubular member, a member threaded in the lower end of the inner tubular member and having a bore therethrough providing an intake passage for said inner tubular member, and spring controlled spaced apart pressure actuated members adapted for reciprocatory movement within said inner tubular member and to provide sealing means between the well and inner tubular member when pressure is applied, ports of communication between the chambers of the casings through which fluid flows when the spaced members are in raised position, said spaced members when in lowered position uncovering the ports and allowing the pressure to be by-passed into the chamber of the outer casing for lifting the fluid therein, said inner tubular member comprising a plurality of open ended sections coupled in end to end relation and the upper most of said sections having a perforated lower end portion, a pressure pipe extending into said last mentioned section and having the wall thereof in spaced relation to said last mentioned section to provide an oil receiving space therebetween and an annular member threaded within the lower end of said one section for closing the space between said section and said pressure pipe at the bottom of this space.

5. In a device for forcing free rising fluid from a well, inner and outer spaced tubular members, means for closing the upper end of the outer tubular member, means for closing the lower end of said outer tubular member, a member threaded in the lower end of the inner tubular member and having a bore therethrough providing an intake passage for said inner tubular member, and spring controlled spaced apart pressure actuated members adapted for intermittent reciprocatory movement within said inner tubular member, and to provide a seal against fluid rise interiorly of said inner tubular member when moved in one direction, one of said pressure actuating members controlling said intake passage, said inner tubular member at the lower end thereof being provided with ports controllable by said pressure actuated members whereby fluid from the well may be trapped in the space between said inner and outer tubular members, and the pressure utilized for lifting said fluid from the casing sections, said inner tubular member comprising a plurality of open ended sections coupled in end to end relation and the upper most of said sections having a perforated lower end portion, a pressure pipe extending into said last mentioned section and having the wall thereof in spaced relation to said last mentioned section to provide an oil receiving space therebetween, and an annular member threaded within the lower end of said one section for closing the space between said section and said pressure pipe at the bottom of the space, said pressure actuated member comprising a pair of pistons, and said last mentioned annular member having a tapered bore, said pressure pipe having a lowered tapered end fitting conformably within said bore.

6. In a device of the class described, inner and outer spaced tubular members forming therebetween a liquid passage having communication at the lower end thereof with the inner tubular member, a pressure pipe concentrically arranged within the upper portion of said inner tubular member and forming therebetween a liquid receiving and discharge chamber having communication with said passage, and fluid pressure controlled means operable in said tubular member for sealing fluid against rising in the tubular member and diverting the pressure into the chamber of the outer tubular member and subsequently forcing the liquid upwardly to to be finally exhausted through the discharge chamber.

7. In a device of the class described, inner and outer spaced tubular members forming therebetween a liquid passage, a pressure pipe concentrically arranged within the upper portion of the inner tubular member and forming therebetween a liquid receiving and discharge chamber having communication with said passage, said inner tubular member having an intake passage in the lower end thereof, a valve seat at the inner end of the intake passage, a pair of spaced alined pressure actuated pistons operable within the inner tubular member, one of said pistons being adapted to rest on the valve seat, said inner tubular member having ports above the valve seat controllable by said pistons, said ports being arranged in pairs, the ports of one pair being normally disposed between said pistons, and the ports of the second pair normally above the upper piston when the lower piston is at rest on said valve seat.

In testimony whereof I affix my signature.

PHILLIP G. SHERRY.